US005586689A

United States Patent [19]
D'Amato

[11] Patent Number: 5,586,689
[45] Date of Patent: Dec. 24, 1996

[54] SQUEEZABLE RECEPTACLE HAVING A CUT-OUT PORTION IN AN END SECTION THEREOF

[75] Inventor: Antonio D'Amato, Arzano, Italy

[73] Assignee: Seda S.p.A., Napoli, Italy

[21] Appl. No.: 418,427

[22] Filed: Apr. 7, 1995

[30] Foreign Application Priority Data

Apr. 12, 1994 [EP] European Pat. Off. ............ 94105630

[51] Int. Cl.$^6$ .................................... B65D 35/00
[52] U.S. Cl. .................... 222/92; 229/4.5; 229/117.12
[58] Field of Search .................... 222/92, 107; 426/115; 229/4.5, 198.1, 117.12

[56] References Cited

U.S. PATENT DOCUMENTS

| 1,294,011 | 2/1919 | Williams | 222/107 |
| 1,741,490 | 12/1929 | Angell | 229/4.5 |
| 2,147,349 | 2/1939 | Piquerez | 222/107 |
| 4,813,862 | 3/1989 | Bowers et al. | 222/107 |

FOREIGN PATENT DOCUMENTS

| 180241 | 5/1986 | European Pat. Off. | 426/115 |
| 0487765 | 6/1992 | European Pat. Off. | |
| 570370 | 4/1924 | France | |

*Primary Examiner*—Gregory L. Huson
*Assistant Examiner*—Philippe Derakshani
*Attorney, Agent, or Firm*—Burns, Doane, Swecker & Mathis, L.L.P.

[57] ABSTRACT

The present invention refers to a squeezable receptacle (1), especially for ice cream, comprising a body (3) which tapers downwards from a receptacle opening (2) and the wall (4) of which is defined by a circumferential surface (9) held together in an overlapping area (5) extending along a left-hand side and a right-hand side surface line (6, 7), said body (3) having at the lower end (8) thereof a flattened end section (17). This receptacle is to be improved in such a way that it will not leak, not even if it is subjected to stress for a prolonged period of time, and that it still has the advantages of the known receptacle and can be produced without any difficulties. In accordance with the present invention, these problems are solved by the features that, in the end section (17), a cut-out portion (10, 11) is formed in at least one surface line (6, 7), said cut-out portion (10, 11) being open towards the respective other surface line (6, 7) and being arranged, at least partially, in the overlapping area (5).

15 Claims, 3 Drawing Sheets

SQUEEZABLE RECEPTACLE HAVING A CUT-OUT PORTION IN AN END SECTION THEREOF

BACKGROUND AND SUMMARY

The present invention refers to a squeezable receptacle, especially for ice cream, comprising a body which tapers downwards from a receptacle opening and the wall of which is defined by a circumferential surface held together in an overlapping area extending along a left-hand side and a right-hand side surface line, said circumferential surface having at the lower end thereof a flattened end section.

Such a receptacle is known e.g. from EP 0487765 A1. Ice cream, especially water ice, contained in this receptacle is continuously squeezed out of the receptacle opening by the hands of a consumer in view of the fact that the receptacle is warmed up, and is then eaten. Due to the body heat, a melting sliding layer will be formed between the wall of the body of the receptacle and the ice cream. Due to the shape of the receptacle, the ice cream can be squeezed out in a simple manner by gradually squeezing the receptacle, and, when the pressure applied to the wall of the receptacle body is reduced, the ice cream can slide back into the receptacle.

While the ice cream is being eaten, an increasingly large amount of the ice cream contacting the warmed-up wall of the receptacle body will become liquid. This liquid ice cream will collect at the lower end of the body above the flattened end section.

With regard to the known receptacle, it must be taken into account that the wall of the body is defined by a circumferential surface held together in an overlapping area, which extends along a left-hand side and a right-hand side surface line, so as to form said body. The holding together is primarily effected by interconnecting the overlapping sections of the circumferential surface by means of an adhesive. In order to seal the body at the lower end thereof in this connection, the circumferential surface is provided with the flattened end section in which the body is squeezed together completely. The overlapping area extends along the whole body, i.e. also in said end section.

The known receptacle is disadvantageous insofar as, upon producing the end section which is used for closing the lower end of the body, an excessive accumulation of material will occur, due to the circumferential surface which is squeezed together, in the overlapping area and in the vicinity of said overlapping area. This excessive accumulation of material may have the effect that it is impossible to flatten and, consequently, seal the end section completely. The receptacle will thus first be leakproof at the lower end of the receptacle body when ice cream is being eaten. It may, however, happen that the lower end of the body begins to leak due to the fact that the receptacle is squeezed together for removing the ice cream and due to the resultant stress on the receptacle; leakage will preferably occur at the point where an excessive accumulation of material occurred upon forming the end section. The stronger the stress on the receptacle during consumption of the ice cream, the sooner such leakage appears.

Taking the known receptacle as a basis, it is therefore the object of the present invention to improve said known receptacle in such a way that it will not leak, not even if it is subjected to stress for a prolonged period of time, and that it still has the advantages of the known receptacle and can be produced without any difficulties.

For solving this task, a receptacle having the features of the generic clause of claim 1 is provided in the end section of at least one surface line with a cut-out portion which is open towards the respective other surface line, said cut-out portion being arranged, at least partially, in the overlapping area.

The provision of such a cut-out portion has the effect that the thickness of the material is reduced in the overlapping area and that displaced material can simultaneously penetrate, at least partially, into the cut-out portion. An excessive accumulation of material during flattening of the end section is thus avoided almost completely so that leakproofness of the receptacle at the lower end of the receptacle body is guaranteed even in the case of strong stress on said receptacle. In addition, the other function of the receptacle concerning the squeezing of ice cream out of the receptacle opening is not influenced in any way. Furthermore, the provision of a cut-out portion will make the production of the receptacle from a simple blank only slightly more complicated.

For additionally preventing an excessive accumulation of material, it turned out to be advantageous when the right-hand side surface line and the left-hand side surface line are provided with at least one right-hand side cut-out portion and at least one left-hand side cut-out portion, respectively. In principle, said cut-out portions may have any shape, but simple geometrical shapes such as triangles, quadrangles, semicircles or the like should preferably be used.

In accordance with a different embodiment of the present invention, only one surface line may, by way of example, be provided with a cut-out portion, the other surface line having an essentially complementary projection which is fitted into the associated cut-out portion upon producing the end section. The overlapping area is thus interrupted by the fitting together of the cut-out portion and of the projection, and this has the effect that material which is displaced when the end section is being flattened can accumulate in the area of said cut-out portion and said projection. The flattening and the squeezing together in the lower end section also guarantees a reliable sealing at the lower end of the receptacle body.

In accordance with a further advantageous embodiment, the right-hand side cut-out portion and the left-hand side cut-out portion are arranged such that they overlap each other. Said cut-out portions may be arranged in a partly, or in a completely overlapping mode of arrangement.

In order to further facilitate the production of the receptacle according to the present invention, the right-hand side cut-out portion and the left-hand side cut-out portion preferably have essentially the same structural design.

For reliably preventing an excessive accumulation of material and for further improving the sealing effect at the same time, it will, in this connection, be advantageous when the the right-hand side cut-out portion and the left-hand side cut-out portion each have an end edge which is displaced inwards relative to the rest of the respective surface line in parallel therewith, said end edges being arranged in abutting relationship.

In order to facilitate the association of the two cut-out portions as well as the production thereof, the right-hand side cut-out portion and the left-hand side cut-out portion are rectangular in shape.

For producing the overlapping area and the end section, the right-hand side surface line can be arranged such that it is the outer surface line in the overlapping area in accordance with one embodiment. The left surface line is, consequently, arranged in the interior of the receptacle, the width of the overlapping area resulting essentially from the distance between right and left surface lines. Only in the area of the cut-out portions, the two surface lines are arranged e.g. in abutting relationship along the end edges of the cut-out portions.

In accordance with a different embodiment of the present invention, the right-hand side surface line is arranged in said overlapping area such that it constitutes the outer surface line down to the right-hand side cut-out portion and the inner surface line from said right-hand side cut-out portion to the lower end of the body for further improving the sealing effect in the end section. In this case, the surface lines intersect in the area of the cut-out portions, whereby a labyrinth seal is virtually formed in this area.

In the case of both embodiments, the relative arrangement of the surface lines can be interchanged without losing the respective advantages.

For a simple production of the receptacle according to the present invention, the circumferential surface is made from a blank having the shape of a circular-ring sector. The blank is preferably produced such that the respective cutout portions and the edge notches for the end section, which are known per se, are simultaneously formed therein. For forming the body, the blank is bent such that its surface lines move towards one another, whereby an essentially frustoconical shape will be produced. For forming the frustum of a cone, one surface line is arranged in overlappings. spaced relationship with the other surface line and the circumferential surface is connected to itself in the overlapping area. In so doing, the cut-out portions in the end section of the circumferential surface and the known edge notches are associated with one another in an appropriate manner. Finally, the frustum of a cone is squeezed together at the lower end of its body whereby the flattened end section is formed. This squeezing together may be carried out simultaneously with the connection of the circumferential surface in the overlapping area at least in the end section or when the circumferential surface has already been connected in the end section. The squeezing together produces also, in a manner known per se, the permanent sealing in the end section.

In order to improve in this respect the sealing effect in the overlapping area as well as in the end section, it will be advantageous when a sealing and adhesive film is arranged in the overlapping area and/or in the end section.

In order to use the adhesive film only at the location where it is actually required, it will be advantageous to provide the features that the sealing and adhesive film is secured to the circumferential surface along one surface line on the inner side of said circumferential surface, that it is turned round said one surface line onto the outer side of the circumferential surface, and that it extends there essentially up to the other one of said surface lines. When the overlapping area and/or the end section are squeezed together, if desired with addition of heat, an intimate connection of the overlapping areas of the circumferential surface will be obtained.

For better and safer handling of the receptacle, it will also be advantageous to provide the feature that the overlapping area and/or the end section is/are provided with a fluting on the outer side. This fluting can, by way of example, be produced simultaneously with the squeezing together of the overlapping area and/or the end section. It is, of course, also possible to provide such a fluting at some other point on the outer side of the receptacle. In addition, it is also possible to provide projections on the inner side of the receptacle, said projections preventing, by offering resistance to the sliding movement, the ice cream from sliding out of the receptacle body too fast.

For improving the optical attractiveness and for making the surface of the receptacle body more interesting, said fluting may have, in certain sections thereof, a different orientation and/or a different number of flutes per unit area.

The right-hand side surface line and the left-hand side surface line are preferably straight lines whereby production of the respective blank will be simplified. Said surface lines may, however, also extend in a zigzag or wave shape or they may have some other shape.

The material used for the receptacle is preferably a comparatively stiff but elastic material, such as paper or cardboard with a polyethylene coating, paper or cardboard with an aluminium coating or the like.

BRIEF DESCRIPTION OF THE DRAWINGS

In the following, advantageous embodiments of the present invention will be explained and described in detail on the basis of the figures shown in the drawing, in which.

DETAILED DESCRIPTION

Figure 1:
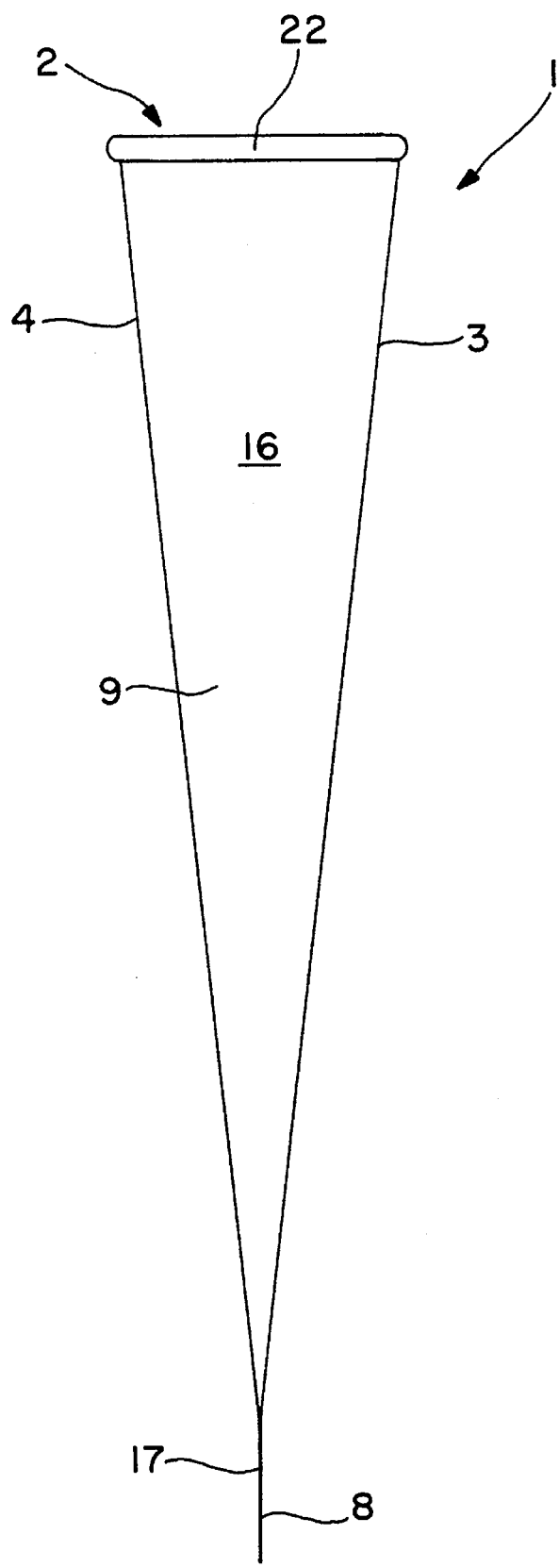
FIG. 1 shows a side view of a receptacle according to the present invention.

FIG. 1 shows a side view of the receptacle 1 according to the present invention. The receptacle 1 is provided with a body 3 tapering downwards from a receptacle opening 2. This body has essentially the shape of an inverted cone having at its tip, i.e. at the lower end 8 of the body, a flattened end section 17. In the representation according to FIG. 1, this end section extends perpendicularly to the plane of the figure.

The body 3 has, in principle, a smooth outer side 16 defined by the wall 4 of said body. Said wall 4 corresponds to the circumferential surface 9 of the conical body 3.

The receptacle opening 2 is provided with a circumferentially extending peripheral bead 22 which is formed by bordering an upper end section of the circumferential surface 9. The receptacle opening 2 may be closed by a removable receptacle cover, which is not shown.

Figure 2:
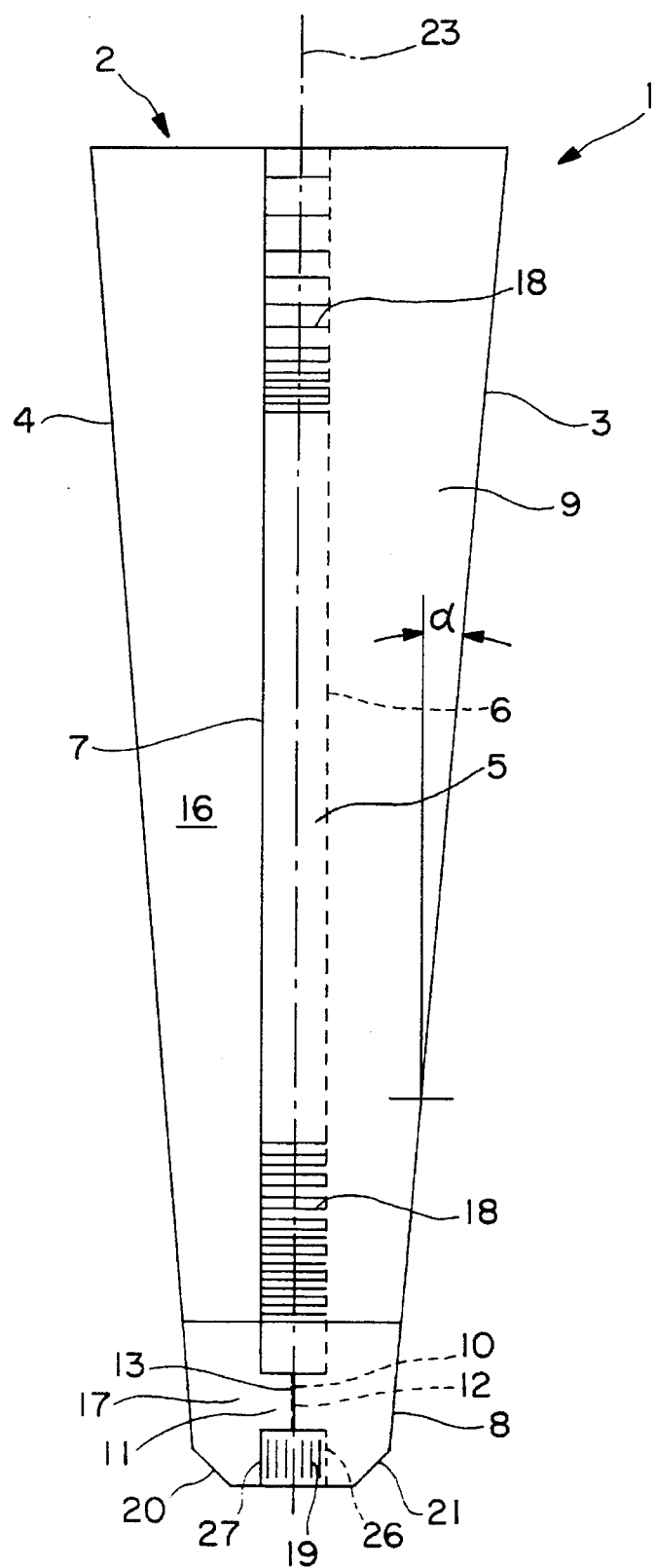
FIG. 2 shows a front view of a receptacle according to the present invention.

FIG. 2 shows a front view of the receptacle according to FIG. 1. In order to simplify the representation, the peripheral bead 22 of FIG. 1 has been omitted.

Like reference numerals have been used to designate identical elements and only part of these reference numerals are mentioned again.

In the top view according to FIG. 2, the end section 17 at the lower end 8 of the body has an essentially trapezoidal cross-section, two edges of the trapezoid being cut off by edge notches 20 and 21 symmetrically with respect to the longitudinal centre line 23.

In the direction of the longitudinal centre line 23, an overlapping area 5 is formed, which extends from the receptacle opening 2 down to the lower end 8 of the body. The overlapping area 5 is formed due to the fact that the circumferential surface 9 is arranged in an overlapping mode of arrangement in this region, a right-hand side surface line 7 being arranged in parallel, spaced relationship with a left-hand side surface line 6 on the outer side 16 of the wall 4 of the body. In the overlapping area, the circumferential surface 9 is connected to itself.

The overlapping area 5 has a transverse fluting 18 on the outer surface thereof, said fluting 18 extending essentially at right angles to the longitudinal centre line 23. In the vicinity of the receptacle opening 2, said fluting 18 comprises less flutes per unit area than in the rest of the overlapping area.

In the front view according to FIG. 2, the body 3 tapers in the direction of the lower end 8 of said body, a tapering angle α being included by said body 3 and a vertical extending parallel to the longitudinal centre line 23. The tapering angle α ranges approximately from 2° to 15°.

The overlapping area 5 is interrupted by a left-hand side cut-out portion 10 and by a right-hand side cut-out portion 11 in the end section 17. The left-hand side cut-out portion 10 is formed in the left-hand side surface line 6 and the right-hand side cut-out portion 11 is formed in the right-hand side surface line 7. Both cut-out portions 10 and 11 are arranged relative to one another in such a way that end edges 12 and 13 thereof are arranged in abutting relationship, i.e. that the end edge 13 of the right-hand side cut-out portion 11 extends on the right hand side of the end edge 12 of the left-hand side cut-out portion 10 parallel to said end edge 12 and immediately adjacent thereto. Subsequent to the cut-out portions 10 and 11, the overlapping area 5 is continued, said overlapping area having a fluting 19 which extends parallel to the longitudinal centre line 23. The whole end section 17 can be provided with flutings 18 and 19, respectively, in a corresponding manner.

In the embodiment shown according to FIG. 2, the end section 27 of the right-hand side surface line 7 is arranged on the outer side 16 of the body 3 and the end section 26 of the left-hand side surface line 6 is arranged on the inner side of the body 3. This relative arrangement of the left-hand side and right-hand side surface lines 6 and 7 is provided throughout the whole overlapping area 5. In the case of a another embodiment, the relative arrangement of the end sections 26 and 27 is the other way round, i.e. the end section 26 is arranged on the outer side 16 and the end section 27 is arranged on the inner side of the body.

Figure 3:
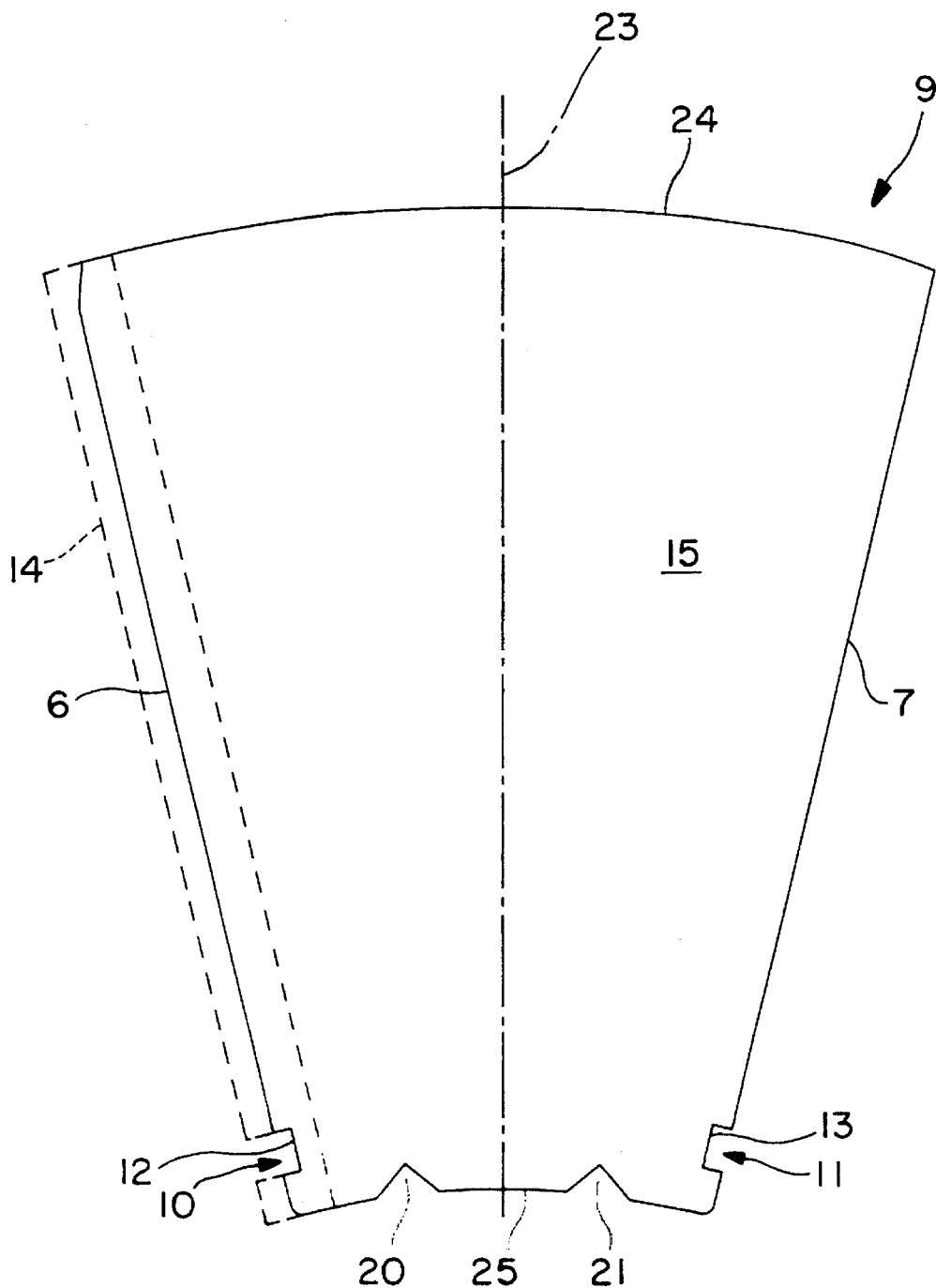
FIG. 3 shows a top view of a blank for the receptacle according to the present invention.

In FIG. 3, a blank for the circumferential surface 9 of the receptacle according to the present invention is shown. The shape of the circumferential surface 9 corresponds essentially to that of a circular-ring sector. For forming the receptacle according to FIG. 1 and 2, the circumferential surface 9 is folded axially symmetrically with respect to the longitudinal centre line 23 so that the right-hand side surface line 7 is moved along a curve to a position above the left-hand side surface line 6 and attached to the outer side 16 of the receptacle according to FIG. 2. The plane of the figure according to FIG. 3 will thus become the inner side 15 of the receptacle 1 according to FIG. 2.

The blank is delimited by an upper edge 24 at the upper end thereof and by a lower edge 25 at the lower end thereof. The upper edge 24 extends circumferentially around the receptacle opening 2 according to FIG. 1 or 2 and the lower edge 25 forms the lower end 8 of the body according to FIG. 2.

The left-hand side and the right-hand side surface lines 6 and 7 have formed therein cut-out portions 10 and 11 in the vicinity of the lower edge 25. Both cut-out portions have an essentially rectangular shape, one of the longer sides of the rectangles being defined by an end edge 12 and an end edge 13, respectively. The shorter sides of the rectangles extend at right angles to the rest of the surface line, the cut-out portions 10 and 11 being open on the side opposite said end edges 12 and 13.

The lower edge 25 has provided therein the edge notches 20 and 21 symmetrically with respect to and in spaced relationship with the longitudinal centre line 23. The shape of the two edge notches corresponds essentially to that of an isosceles triangle which is open towards the lower edge 25.

In accordance with FIG. 2, the blank of the circumferential surface 9 is folded in the end section 17 in such a way that the legs of each of said edge notches 20 and 21, respectively, are placed on top of one another.

Along the left-hand side surface line 6, a sealing and adhesive film 14 is arranged on the inner side 15 of the circumferential surface 9. About half the width of the sealing and adhesive film 14 projects outwards beyond the left-hand side surface line 6. In the area of the left-hand side cut-out portion 10, the film is provided with a corresponding cut-out portion. When the receptacle is put together, the projecting area of the sealing and adhesive film 14 will be turned onto the outer side 16, cf. FIG. 2, and will then extend approximately up to a point below the right-hand side surface line 7. The film especially serves to improve the connection of the circumferential surface 9 to itself in the overlapping area 5 as well as to enhance the sealing of the receptacle.

I claim:

1. A squeezable receptacle, comprising:
   a body, the body having a receptacle opening and a wall, the body tapering downward from the receptacle opening, the wall being defined by a circumferential surface held together in an overlapping area extending along a left-hand side edge and a right-hand side edge, said circumferential surface having at a lower end thereof a flattened end section, a cut-out portion being provided in the end section, the cut-out portion extending in from at least one of the left-hand side edge and the right-hand side edge, said cut-out portion being open towards a respective other edge and being arranged, at least partially, in the overlapping area.

2. A squeezable receptacle according to claim 1, the right-hand side edge and the left-hand side edge are provided with at least one right-hand side cut-out portion and at least one left-hand side cut-out portion.

3. A squeezable receptacle according to claim 2, wherein the right-hand side cut-out portion and the left-hand side cut-out portion are arranged such that they overlap each other.

4. A squeezable receptacle according to claim 3, wherein the right-hand side cut-out portion and the left-hand side cut-out portion are shaped substantially identically.

5. A squeezable receptacle according to claim 1, wherein the right-hand side cut-out portion and the left-hand side cut-out portion each have an end edge which is disposed inwardly relative to the right-hand side edge and the left-hand side edge, respectively, said end edges being arranged in abutting relationship.

6. A squeezable receptacle according to claim 1, wherein the right-hand side cut-out portion and the left-hand side cut-out portion are rectangular in shape.

7. A squeezable receptacle according to claim 1, wherein the right-hand side edge is disposed on an exterior of the body.

8. A squeezable receptacle according to claim 1, wherein the right-hand side edge is disposed on an exterior of the body from the receptacle opening to the right-hand side cut-out portion is disposed on an interior of the body from said right-hand side cut-out portion to the lower end of the body.

9. A squeezable receptacle according to claim 1, wherein the circumferential surface is made from a blank shaped as a circular-ring sector.

10. A squeezable receptacle according to claim 1, further comprising a sealing and adhesive film provided in at least one of the overlapping area the end section.

11. A squeezable receptacle according to claim 10, wherein the sealing and adhesive film provided on the circumferential surface on art inner side of said circumferential surface adjacent one of said left-hand side edge and said right-hand side edge and extends around onto art outer side of said circumferential surface substantially up to the other one of said left-hand side edge and said right-hand side edge.

12. A squeezable receptacle according to claim 1, wherein at least one of the overlapping area and the end section includes a fluting on art outer side thereof.

13. A squeezable receptacle according to claim 12, wherein said fluting is oriented differently in different. sections thereof.

14. A squeezable receptacle according to claim 1, wherein the right-hand side edge and the left-hand side edge define straight lines.

15. A squeezable receptacle according to claim 12, wherein said fluting has, in different sections thereof, a different number of flutes per unit area.

* * * * *